United States Patent
Corten et al.

(10) Patent No.: US 8,882,459 B2
(45) Date of Patent: Nov. 11, 2014

(54) WINDTURBINE COMPRISING A BEARING SEAL

(75) Inventors: Gustave Paul Corten, Alkmaar (NL);
Cornelis Johannes Antonius Versteegh, Hilversum (NL); Herman Luimes, Dieren (NL)

(73) Assignee: XEMC Darwind B.V., Hilversum (NL)

( * ) Notice: Subject to any disclaimer, the term of this patent is extended or adjusted under 35 U.S.C. 154(b) by 924 days.

(21) Appl. No.: 12/919,913

(22) PCT Filed: Feb. 27, 2009

(86) PCT No.: PCT/EP2009/052363
§ 371 (c)(1),
(2), (4) Date: Jan. 3, 2011

(87) PCT Pub. No.: WO2009/106610
PCT Pub. Date: Sep. 3, 2009

(65) Prior Publication Data
US 2011/0200427 A1    Aug. 18, 2011

(30) Foreign Application Priority Data

Feb. 29, 2008 (EP) ..................................... 08102156

(51) Int. Cl.
| | |
|---|---|
| *F01D 25/16* | (2006.01) |
| *F03D 11/00* | (2006.01) |
| *F16C 19/18* | (2006.01) |
| *F16C 33/76* | (2006.01) |

(52) U.S. Cl.
CPC .......... *F03D 11/0008* (2013.01); *F16C 19/184* (2013.01); *Y02E 10/725* (2013.01); *Y02E 10/722* (2013.01); *F05B 2240/57* (2013.01); *F16C 33/76* (2013.01); *F16C 2360/31* (2013.01); *F05B 2220/7066* (2013.01); *F16C 2300/14* (2013.01)

USPC ........................ 415/230; 415/229; 416/146 A

(58) Field of Classification Search
USPC ............ 416/146; 415/170.1, 171.1, 229, 230; 384/477, 484, 486, 624
See application file for complete search history.

(56) References Cited

U.S. PATENT DOCUMENTS 3,773,336 A * 11/1973 Walter et al. .................. 277/551
4,008,897 A    2/1977 Wentworth (Continued)

FOREIGN PATENT DOCUMENTS

CA    2288230 A1    4/2001
CA    2288230 A1 *  4/2001

(Continued)

OTHER PUBLICATIONS

Versteegh, Office Action mailed Oct. 5, 2010, U.S. Appl. No. 12/473,866, filed May 28, 2009.

(Continued)

*Primary Examiner* — Edward Look
*Assistant Examiner* — Jesse Prager
(74) *Attorney, Agent, or Firm* — Steven M. Koehler; Westman, Champlin & Koehler, P.A.

(57) ABSTRACT

Wind turbine provided with a bearing supporting a hub carrying rotor blades, the bearing comprising a rotational bearing race connected to the hub and a stationary bearing race, a lubrication area between the bearing races which area is confined at both ends by first seal rings sealing the gap between the rotational bearing race and stationary parts to form a lubrication barrier. At one or both ends of the lubrication area a redundant seal ring is arranged at a distance from the first seal ring in or near the gap to be sealed.

7 Claims, 4 Drawing Sheets

(56) References Cited

U.S. PATENT DOCUMENTS

| | | | |
|---|---|---|---|
| 5,605,337 A | 2/1997 | Puri | |
| 5,820,132 A | 10/1998 | Marnot | |
| 7,161,259 B2* | 1/2007 | Lagerwey | 290/44 |
| 7,748,473 B2 | 7/2010 | Wells et al. | |
| 2005/0230979 A1* | 10/2005 | Bywaters et al. | 290/44 |
| 2006/0177167 A1* | 8/2006 | Tsujimoto | 384/486 |
| 2006/0182634 A1* | 8/2006 | Kirsch et al. | 416/244 A |
| 2007/0127858 A1 | 6/2007 | Nakagawa | |
| 2010/0014791 A1 | 1/2010 | Versteegh | |

FOREIGN PATENT DOCUMENTS

| | | | |
|---|---|---|---|
| EP | 1653079 A | 5/2006 | |
| EP | 1705392 A | 9/2006 | |
| EP | 1710432 A | 10/2006 | |
| EP | 1927795 A | 4/2008 | |
| EP | 1927795 A1 * | 6/2008 | |
| FR | 2742837 A1 | 6/1997 | |
| WO | WO 2004/015288 | 2/2004 | |
| WO | WO 2006/099014 A | 9/2006 | |
| WO | WO 2008065153 A1 * | 6/2008 | |
| WO | WO 2009/106610 | 9/2009 | |

OTHER PUBLICATIONS

Official Search Report of the European Patent Office Patent Office in counterpart foreign application No. PCT/EP2009/052363 filed Feb. 27, 2009.

Written Opinion of the European Patent Office Patent Office in counterpart foreign application No. PCT/EP2009/052363 filed Feb. 27, 2009.

Official Search Report of the European Patent Office in foreign application No. PCT/EP2007/062970 filed Nov. 28, 2007.

Written Opinion of the European Patent Office in foreign application No. PCT/EP2007/062970 filed Nov. 28, 2007.

* cited by examiner

WINDTURBINE COMPRISING A BEARING SEAL

CROSS-REFERENCE TO RELATED APPLICATION

The present application is a Section 371 National Stage Application of and claims priority of International patent application Serial No. PCT/EP2009/052363, filed Feb. 27, 2009, and published as WO 2009/106610 in English.

BACKGROUND

The discussion below is merely provided for general background information and is not intended to be used as an aid in determining the scope of the claimed subject matter.

An aspect of the present invention relates to a wind turbine comprising a bearing seal, in particular to wind turbines with a direct drive generator, e.g. direct drive wind turbines of 1 MW or more. In wind turbines comprising a direct drive generator, the rotor is directly driven by the rotor. The main bearing is located between the housing ring and the rotor and is designed to absorb the gravitational and aerodynamic loads on the rotor. Particularly in direct drive systems without transmissions, diameters are large and circumferential speeds are high. The service life of the main bearing determines to a large extent the service life of the wind turbine as replacing the main bearing leads to high costs. In circumstances whereby the wind turbine is placed in difficult accessible locations, for instance at sea, replacing the main bearing during service life must be avoided. The service life of the main bearing depends to a large extent on the service life of the oil seals between the rotating parts and the stationary parts of the main bearing. These oil seals are required to ensure that sufficient lubrication means such as oil remains in the main bearing. The assembly and disassembly of oil seals requires dismantling of the equipment.

A wind turbine with a bearing seal is for example disclosed in WO 2004/015288. This bearing seal comprises a single two-piece seal at either side of the gap between the inner and outer bearing races. The complex labyrinth structure of the seal parts may considerably reduce the life time of the seals.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

A wind turbine is provided with a bearing supporting a hub carrying rotor blades, the bearing comprising a rotational bearing race connected to the hub, a stationary bearing race, and a lubrication area between the bearing races which area is confined at both ends by first seal rings sealing the gap between the rotational bearing race and stationary parts to form a lubrication barrier wherein at one or both ends of the lubrication area a redundant seal ring is arranged at a distance from the first seal ring in or near the gap to be sealed.

The redundant ring is already present surrounding the axis of rotation and the part between the rotor blades and the housing of the wind turbine, so the rotor does not need to be dismantled when the first seal ring needs to be replaced by the redundant seal ring.

The redundant seal ring can be used to replace the first seal ring. Alternatively, it can be used to support the first seal ring. To that end, the first seal ring and the redundant seal ring can be used in combination right from the start.

In one embodiment, both ends of the gap between the rotating bearing race and the stationary parts comprise a first seal ring and a redundant seal ring.

In use, a thin film of lubrication medium, e.g. a lubrication oil, separates the active seal rings form the sealing surfaces engaged by the seal rings.

Optionally, a third seal ring or even further seal rings can be used as supporting seals and/or as replacement seals.

In a further embodiment the stationary bearing race does not comprise a disengagement section. This means that, if the redundant seal ring is mounted in a support ring spacing both bearing races, the inner bearing race does not comprise a groove or part with reduced or enlarged diameter disengaging the redundant seal ring. In other words, the inner bearing race does not comprise a second sealing area that only cooperates with the redundant seal ring after displacement of the support ring into a second sealing position.

The lubrication area may contain bearing balls spacing the inner and outer bearing races.

Typically, the inner race is stationary while the outer bearing race rotates, being directly driven by the rotor without gearing.

In order to extend service life of the oil seals as much as possible the sealing surfaces are preferably made from tempered steel and have a ground surface. This way the wear on the seal ring can be substantially reduced.

The seals and the exterior seal are for example made from flexible material such as rubber or preferably contain Teflon® or a similar material in order to obtain an enhanced service life.

In a particular embodiment, a support member is used comprising two concentric grooves for holding two seal rings in sealing engagement with lateral sections of the inner and outer bearing races respectively. This way, only the support member needs to be taken off to replace one of the seal rings.

In a further possible embodiment, the first seal ring and the redundant seal ring are mounted in the stationary barrier race facing a support member comprising a concentric recess, the support member being displaceable from a first sealing position wherein the redundant seal ring faces the recess while the first seal ring sealingly engages the support ring, to a second position wherein the redundant seal ring sealingly engages the support ring. This way, the first seal ring can be replaced by the redundant seal ring in a simple and cost effective manner by merely moving the support member to its second position.

In a further alternative embodiment, a ring member can be used to space the bearing races, while for each bearing race a seal ring seals the gap with the ring member, the ring member comprising first fixation element suitable for locking the ring member to the stationary bearing race, and second fixation element suitable for locking the ring member to the rotational bearing race. When the first fixation element locks the ring member to the stationary member race, the seal ring bridging the ring member and the rotational bearing race forms the dynamic seal. After failure due to wear, the first fixation element can be deactivated and the second fixation element can be used to lock the ring member to the rotational bearing race. In that situation, the ring member is rotated together with the rotational bearing race and the seal between the ring member and the stationary bearing race becomes the dynamic seal.

BRIEF DESCRIPTION OF THE ILLUSTRATIVE EMBODIMENTS

Hereafter aspects of the invention are explained by describing various embodiments of the invention with the aid of a drawing. In the drawing:

FIG. 1 shows a side view of a wind turbine;
FIG. 2 shows a detailed section of a bearing of the wind turbine of FIG. 1;
FIG. 3 shows a detail of a second embodiment;
FIG. 4 shows a detail of a third embodiment;
FIG. 5 shows a detail of a fourth embodiment;
FIG. 6 shows a detail of a fifth embodiment;
FIG. 7 shows a detail of a sixth embodiment;
FIG. 8 shows a detail of a seventh embodiment.

DETAILED DESCRIPTION OF THE ILLUSTRATIVE EMBODIMENTS

FIG. 1 shows a wind turbine that is placed on a tower 1 and that has a housing 2. The housing 2 is rotatable around a vertical axis. A housing ring 4 is with one side attached to the housing 2 and at the other side to a main bearing 9. A rotor R, comprising a hub 11 with blades 10 is attached to the main bearing 9 and can rotate around a centreline 3. At the front side the hub 11 is covered by a cap 12. A generator rotor 6 with permanent magnets 5 is attached via a generator flange 8 to the main bearing 9 and rotates with the rotor R. A generator stator 7 is mounted on the housing ring 4. The permanent magnets 5 move along the windings of the generator stator 7 to generate electrical power. The housing 2 can rotate around the vertical axis so that the rotor R can be directed towards the wind.

The wind turbine is designed with a direct drive generator and the generator rotor 6 is directly driven by the rotor R. The main bearing is located between the housing ring 4 and the rotor R and is designed to withstand the gravitational and aerodynamic loads on the rotor R.

FIG. 2 shows the main bearing 9, which is a ball bearing with balls 18, whereby an oil seal device is mounted between a stationary inner bearing race 17 and a rotating outer bearing race 16 on both sides of the balls 18. The inner bearing race 17 is mounted on a flange 26 of the housing ring 4. The generator flange 8 and the hub 11 are mounted on the outer bearing race 16. A support ring 14 is coupled to the outer bearing race 16 by bolts 13. A cylindrical part 27 of the support ring 14 is located between the inner ring 17 and the outer ring 16. A static seal 19 is mounted on the outer circumference of the cylindrical part 27 and seals the opening between the outer ring 16 and the support ring 14. On the inner circumference of the support ring 14 an interior seal 20 and an exterior seal 21 are mounted, whereby the interior seal 20 is nearest to the parts to be lubricated such as the balls 18 and the exterior seal 21 is nearest to the surroundings. The outer circumference of the inner bearing race 17 near the support ring 14 has an exterior sealing surface 28 and an interior sealing surface 29 which is nearest to the parts to be lubricated.

In the embodiment of FIG. 2, the seal rings are mounted in the ring 14. Alternatively one or both of the seal rings 20, 21 can be mounted in the stationary bearing race sealingly engaging the surface of the ring 14.

FIG. 3 shows a further embodiment of a wind turbine according to an aspect of the present invention, which is to a large extent similar to the embodiment of FIG. 2, same parts being numbered with the same reference numbers. In FIG. 3, interior seal 20A is located in a deeper recess storing the seal ring 20A at a distance from the opposite surface of the inner bearing race 17 to prevent wear. Only after failure of the exterior seal ring 21A, the redundant exterior seal ring 20A is removed from its recess and used to replace the interior seal ring 20A. In further alternative embodiments, the recess storing redundant exterior seal 20A can be located elsewhere, for instance in a surface which does not face the inner bearing race 17. Alternatively, the interior seal ring 21A can be stored in a deeper recess as a replacement ring to be used after failure of the exterior seal ring 20A.

Figure 1:
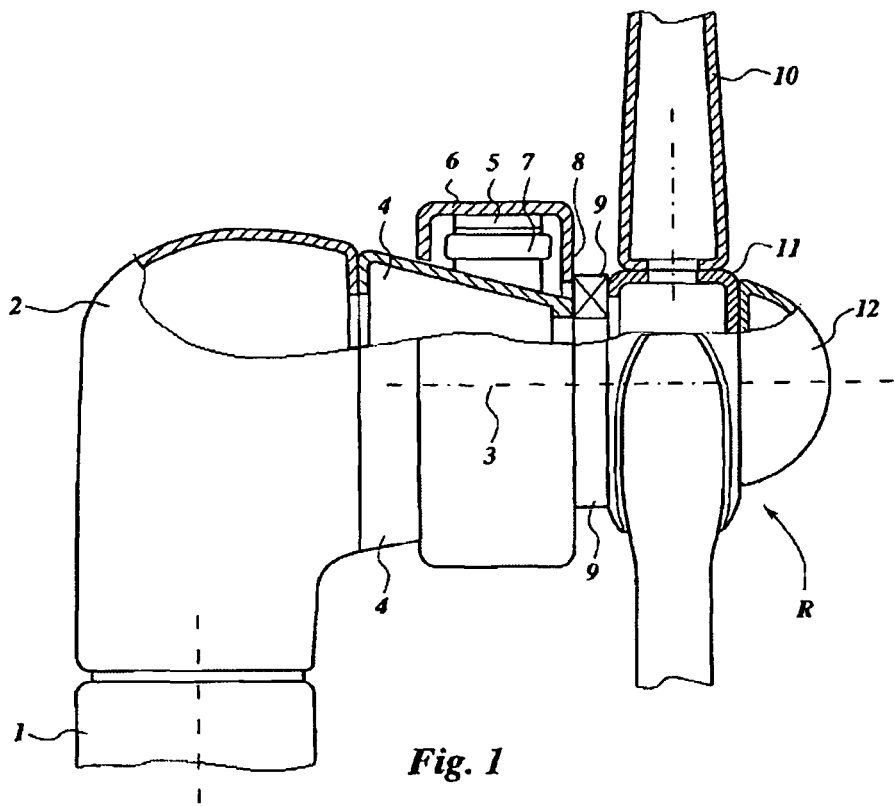
Figure 2:
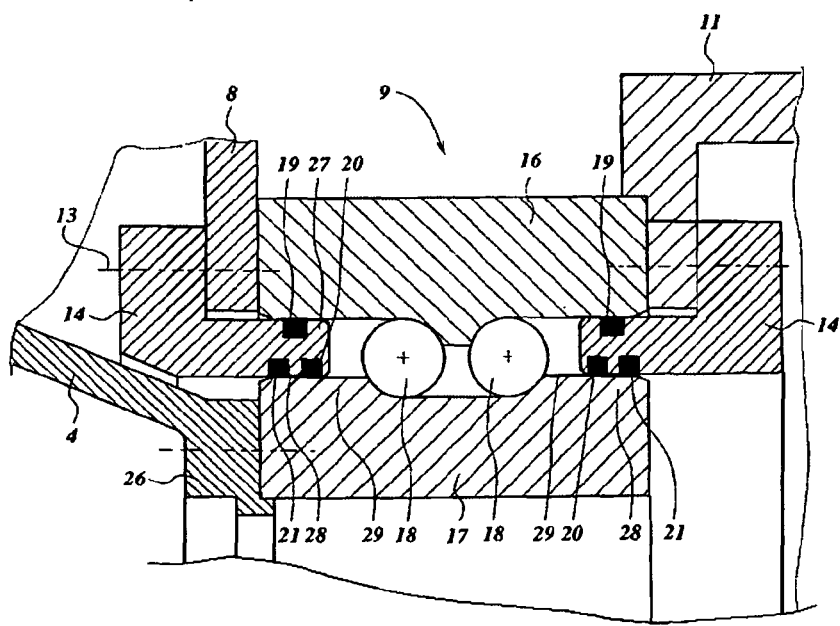
Figure 4:
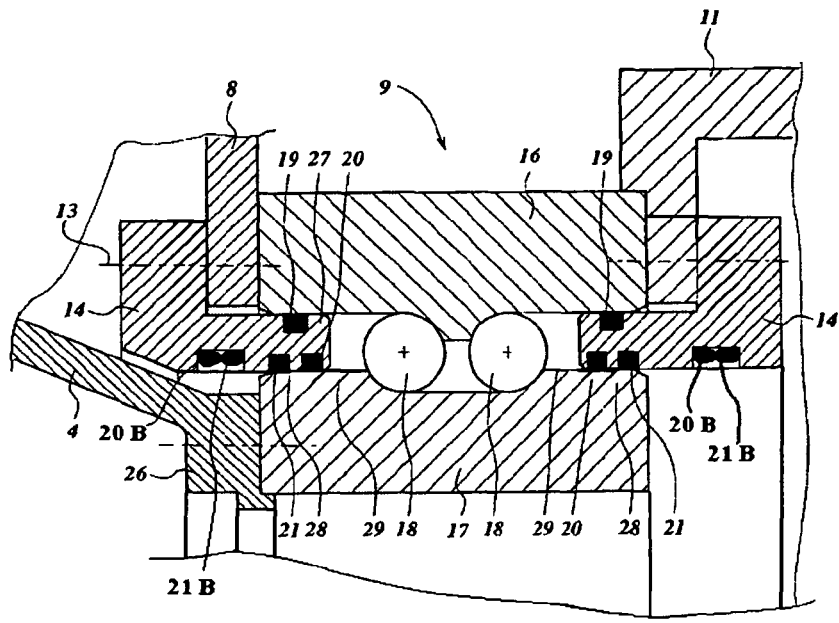
FIG. 4 shows an embodiment which has, just like the embodiment of FIG. 2, two simultaneously active seal rings 20, 21, and two spare redundant seal rings 20B, 21B stored in a recess at a distance from the inner bearing race 17. In an alternative embodiment, the redundant seal ring or seal rings can be stored in a recess within the lubrication area in contact with the lubrication medium.
Figure 3:
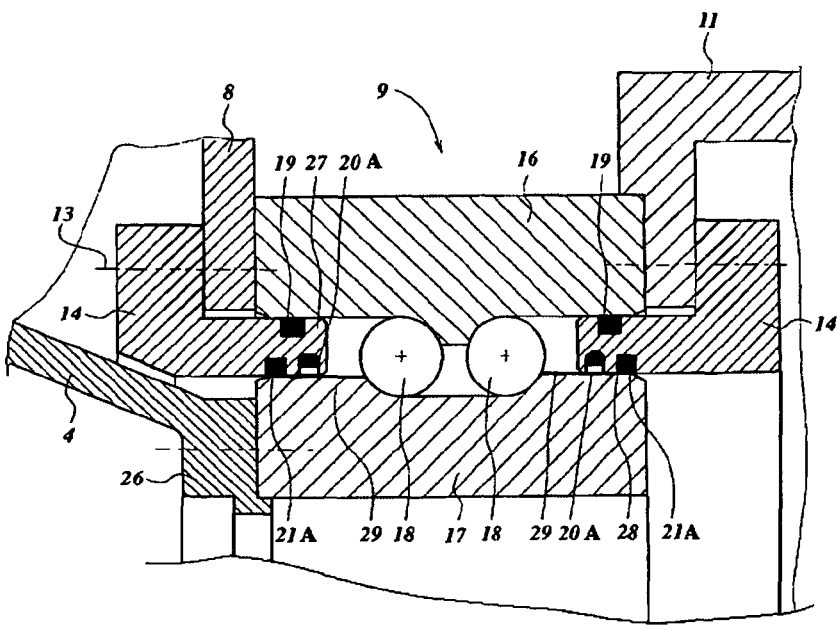
Figure 5:
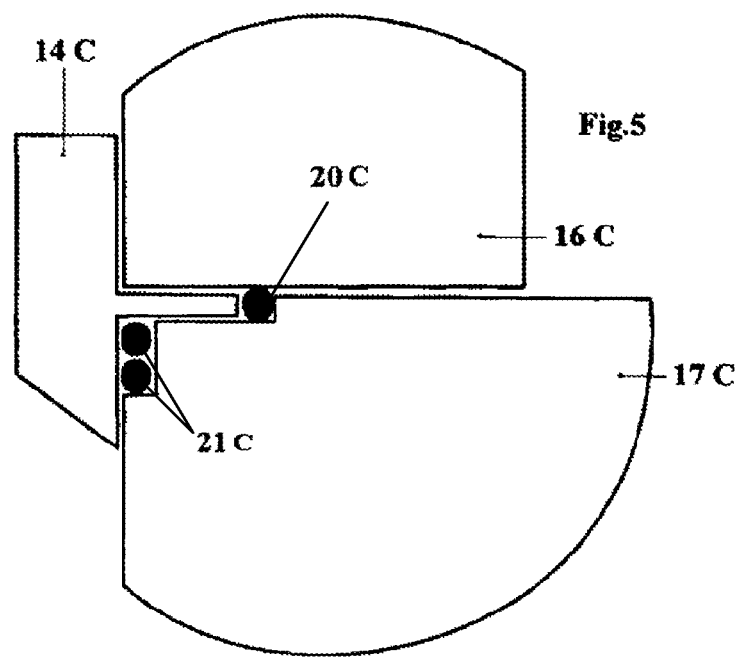
FIG. 5 shows schematically an embodiment wherein a seal ring 20C seals directly the gap between the inner bearing race 17C and outer bearing race 16C. Redundant replacement seals 21C are stored in a recess on the lateral surface of the inner bearing race 17C.
Figure 6:
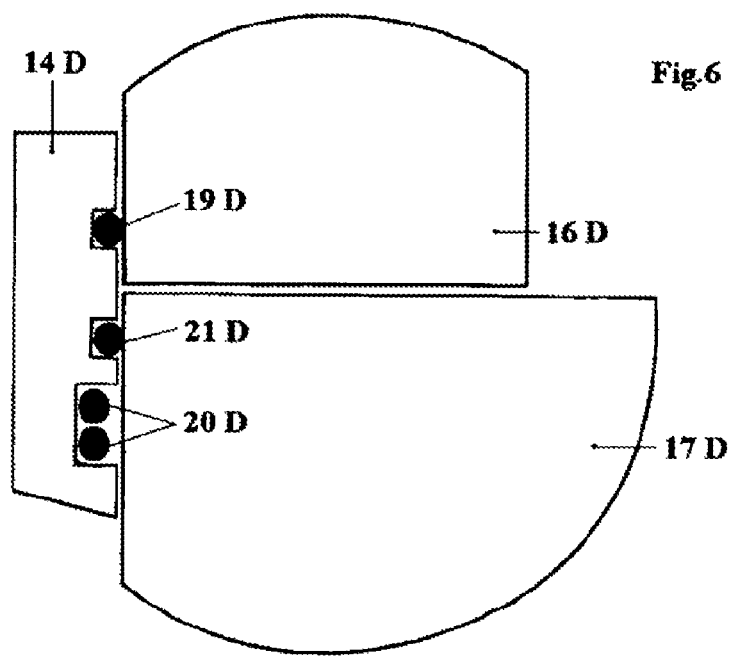

FIG. 6 shows an embodiment having a support member 14D comprising two concentric grooves for holding two seal rings 19D, 21D in sealing engagement with lateral sections of the inner and outer bearing races 17D, 16D respectively. Redundant sealing rings 20D are stored in a separate recess in the support member 14D. In an alternative embodiment, the redundant seal ring or seal rings can be stored in a recess within the lubrication area between seal rings 19D and 21D in contact with the lubrication medium.

Figure 7:
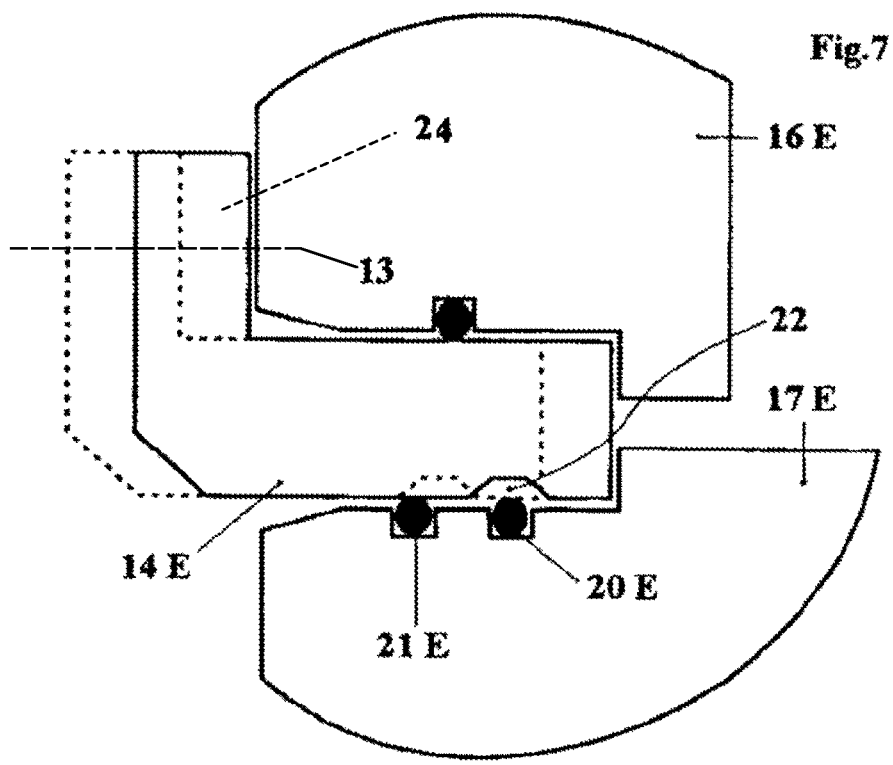

In FIG. 7 there is a selectively installed spacer 24 between the support ring 14E and the outer bearing race 16E (via the generator flange 8 and the hub 11). The support ring 14E is in a first position (solid lines) wherein the seal ring 21E seals against the ring member 14E. A redundant seal ring 20E faces a groove 22 in the opposite surface of support ring 14E so that there is no contact between the support ring 14E and the redundant seal 20E in the first position. As the redundant seal ring 20E is behind the active seal 21E it has no influence from contamination or light and there is no wear on the redundant seal 20E. This way the redundant seal 20E remains ready for use and as long as it is in this first position, it is protected from environmental influences. After a period the end of the service life of the seal ring 21E is detected by observing oil leakage between the seal ring 21E and the sealing surface 28. After determining that the seal ring 21E is at the end of its service life the spacer 24 is installed and the support ring 14E is pushed outwards and fastened to the outer ring 16 with the bolts 13 (via the generator flange 8 or the hub 11). The support ring 14E is now in its second position (dashed lines). In this second position, the seal ring 20E seals on the interior surface of the support ring 14E.

Figure 8:
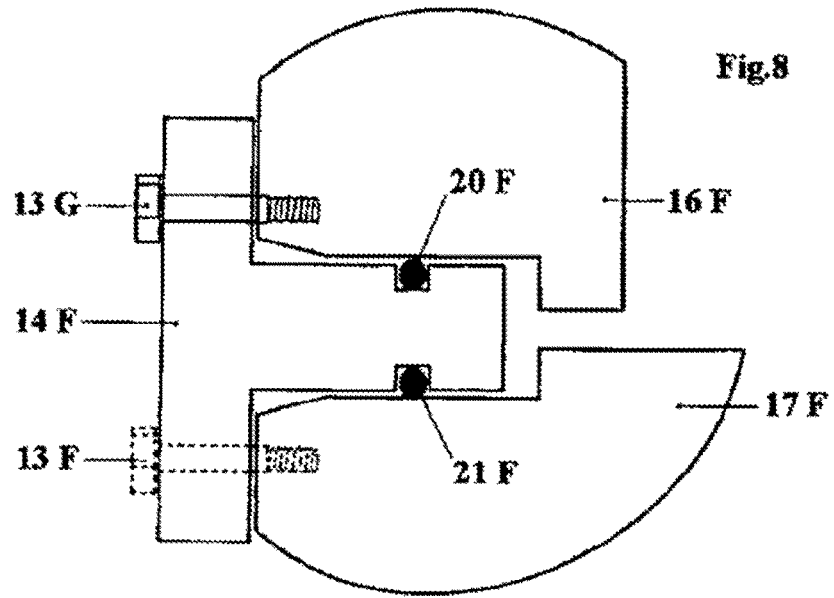

In FIG. 8 a ring member 14F separates the bearing races 16F, 17F. For each bearing race a seal ring 20F, 21F seals the gap with the ring member 14F. The ring member 14F comprises first fixation means 13F (e.g. bolts) to lock the ring member 14F to the stationary bearing race 17F, and second fixation means 13G (e.g. bolts) to lock the ring member 14F to the rotational bearing race 16F. When the first fixation means 13F lock the ring member 14F to the stationary member race 17F, the seal ring 20F bridging the ring member 14F and the rotational bearing race 16F forms the dynamic seal. After failure due to wear, the first fixation means 13F can be deactivated and the second fixation means 13G can be used to lock the ring member to the rotational bearing race 16F. In that situation, the ring member 14F is rotated together with the rotational bearing race 16F and the seal 21F between the ring member 14F and the stationary bearing race 17F becomes the dynamic seal.

In the embodiment shown in the drawings the main bearing is shown as a double row ball bearing. It will be clear to the skilled man that the invention is applicable for other types of ball bearings and for roller bearings or for any other type of bearing.

The invention claimed is:

1. A wind turbine provided with a bearing supporting a hub carrying rotor blades, the bearing comprising a rotational bearing race connected to the hub and a stationary bearing race, wherein a lubrication area between the bearing races is sealed at both ends by first seal rings forming a lubrication barrier in a gap between the rotational bearing race and the stationary bearing race wherein at one or both ends of the lubrication area a redundant seal ring is arranged at a distance from the first seal ring and the gap to be sealed and further comprising a support ring having two concentric grooves configured to hold the first seal ring and the redundant seal ring in sealing engagement with lateral sections of the inner and outer bearing races respectively.

2. A wind turbine provided with a bearing supporting a hub carrying rotor blades, the bearing comprising a rotational bearing race connected to the hub and a stationary bearing race, wherein a lubrication area between the bearing races is sealed at both ends by first seal rings forming a lubrication barrier in a gap between the rotational bearing race and the stationary bearing race wherein at one or both ends of the lubrication area a redundant seal ring is arranged at a distance from the first seal ring in the gap to be sealed and wherein the first seal ring and the redundant seal ring are mounted in one of the bearing races facing a support ring comprising a concentric recess and in that the support ring is displaceable from a first sealing position wherein the redundant seal ring faces the recess while the first seal ring engages the support ring to form a seal, to a second position wherein the redundant seal ring engages the support ring to form a seal.

3. A wind turbine provided with a bearing supporting a hub carrying rotor blades, the bearing comprising a rotational bearing race connected to the hub and a stationary bearing race, wherein a lubrication area between the bearing races is sealed at both ends by first seal rings forming a lubrication barrier in a gap between the rotational bearing race and the stationary bearing race wherein at one or both ends of the lubrication area a redundant seal ring is arranged at a distance from the first seal ring in the gap to be sealed and wherein a support ring separates the bearing races wherein for each bearing race a seal ring seals the gap with the support ring and in that the support ring is selectively connectable to the stationary bearing race and to the rotational bearing race respectively.

4. A wind turbine provided with a bearing supporting a hub carrying rotor blades, the bearing comprising a rotational bearing race connected to the hub and a stationary bearing race, wherein a lubrication area between the bearing races is sealed at both ends by first seal rings forming a lubrication barrier in a gap between the rotational bearing race and the stationary bearing race wherein at one or both ends of the lubrication area a redundant seal ring is arranged at a distance from the first seal ring in the gap to be sealed and further comprising a support ring, wherein the first seal ring and the redundant seal ring are mounted in one of the barrier races facing the support ring concentrically positioned btween the two bearing races at the end of the lubrication area and comprising a concentric recess and wherein the support ring is displaceable from a first sealing position in which the redundant seal ring faces the recess while the first seal ring sealingly engages the support ring, to a second position in which the redundant ring sealingly engages the support ring.

5. A wind turbine provided with a bearing supporting a hub carrying rotor blades, the bearing comprising a rotational bearing race connected to the hub and a stationary bearing race, wherein a lubrication area between the bearing races is confined at both ends by first seal rings sealing the lubrication area, wherein at one or both ends of the lubrication area a redundant seal ring is stored in a recess in a surface not facing a surface of the inner bearing race defining the lubrication area without engaging a sealing surface in order to be available for use after failure of the first seal ring.

6. The wind turbine according to claim 5 and further comprising a support ring positioned proximate an end of both the rotational bearing race and the stationary race and wherein the support ring includes the surface not facing the surface of the inner bearing race defining the lubrication area without engaging a sealing surface.

7. The wind turbine of claim 6 and wherein the support ring comprises two concentric grooves for holding two concentric seal rings in sealing engagement with lateral sections of the inner and outer bearing races respectively.

* * * * *